United States Patent
Chen

(10) Patent No.: US 7,773,597 B2
(45) Date of Patent: Aug. 10, 2010

(54) METHOD AND SYSTEM FOR DYNAMIC STASHING FOR CRYPTOGRAPHIC OPERATIONS USING BEGINNING PACKET INFORMATION

(75) Inventor: Jyhren Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1134 days.

(21) Appl. No.: 11/110,248

(22) Filed: Apr. 20, 2005

(65) Prior Publication Data

US 2006/0239260 A1  Oct. 26, 2006

(51) Int. Cl.
  *H04L 12/28* (2006.01)
(52) U.S. Cl. .................... 370/392; 370/412; 380/43; 711/118; 714/746; 714/752; 714/776
(58) Field of Classification Search ................ 370/389, 370/392, 412
See application file for complete search history.

(56) References Cited

U.S. PATENT DOCUMENTS

| | | | | |
|---|---|---|---|---|
| 5,274,811 A | * | 12/1993 | Borg et al. | 717/128 |
| 5,951,707 A | * | 9/1999 | Christensen et al. | 714/752 |
| 6,487,211 B1 | * | 11/2002 | Yamaguchi | 370/412 |
| 6,633,866 B2 | * | 10/2003 | Kishigami | 707/3 |
| 6,674,769 B1 | * | 1/2004 | Viswanath | 370/469 |
| 6,751,234 B1 | * | 6/2004 | Ono | 370/474 |
| 7,159,030 B1 | * | 1/2007 | Elzur | 709/238 |
| 7,424,019 B1 | * | 9/2008 | Kopelman et al. | 370/392 |
| 2002/0157087 A1 | * | 10/2002 | Jacobsz | 717/135 |
| 2002/0188806 A1 | * | 12/2002 | Rakvic et al. | 711/119 |
| 2003/0208658 A1 | * | 11/2003 | Magoshi | 711/122 |
| 2003/0214957 A1 | * | 11/2003 | Wahoske et al. | 370/100 |
| 2004/0133732 A1 | * | 7/2004 | Minematsu et al. | 711/100 |
| 2004/0170182 A1 | * | 9/2004 | Higashida et al. | 370/401 |
| 2005/0030962 A1 | * | 2/2005 | Hou | 370/412 |
| 2006/0056406 A1 | * | 3/2006 | Bouchard et al. | 370/389 |

* cited by examiner

*Primary Examiner*—Chirag G Shah
*Assistant Examiner*—Salvador E Rivas
(74) *Attorney, Agent, or Firm*—Trellis IP Law Group, PC

(57) ABSTRACT

A system, method, apparatus and machine-readable medium for stashing an information packet, received by a network interface device, are provided. The method includes i) extracting information from the received information packet; ii) determining the stashing size of the information packet; and iii) stashing the information packet, based on the determined size. The information can be extracted from the layer-2, layer-3 and layer-4 headers and trailers of the information packet. Dynamic stashing results in an enhanced performance of the communication systems.

20 Claims, 3 Drawing Sheets

METHOD AND SYSTEM FOR DYNAMIC STASHING FOR CRYPTOGRAPHIC OPERATIONS USING BEGINNING PACKET INFORMATION

BACKGROUND OF THE INVENTION

1. Field of Invention

Embodiments of the present invention relate generally to communications systems such as routers. More particularly, the embodiments of the present invention relate to the determination of the size of the stashing in semiconductor memory devices.

2. Description of the Background Art

As the demands of the networking and telecommunication markets are growing, communication protocols are becoming increasing complex. This, in turn, demands higher performance of the communication systems.

The performance-enhancing features of communication systems include stashing the received information. When a networking device such as an Ethernet controller receives an information packet, information is copied to the layer-2 cache, along with the writing, into the main memory (e.g., Double Data Rate memory). This is referred to as 'stashing'. Stashing ensures that when the network device interrupts the CPU, and the CPU running the network device driver's interrupt handler needs to process the packet, the information packet is already present in the layer-2 cache. Therefore, the CPU does not need to go to the main memory to fetch the packet. This, in turn, improves the router's performance.

Conventional techniques for stashing involve configuring the stashing size manually. Further, the programmer needs to configure the index (offset) of the information packet for the stashing. Manual/static stashing may not be able to adjust the stashing size, based on the information of the packet, thereby utilizing the performance of the processor optimally.

DETAILED DESCRIPTION OF EMBODIMENTS OF THE INVENTION

Various embodiments of the present invention provide a method and system for adjusting the size of stashing of an information packet received by a network interface device. The size is adjusted depending on the information provided by the various headers and trailers of the information packet.

Figure 1:
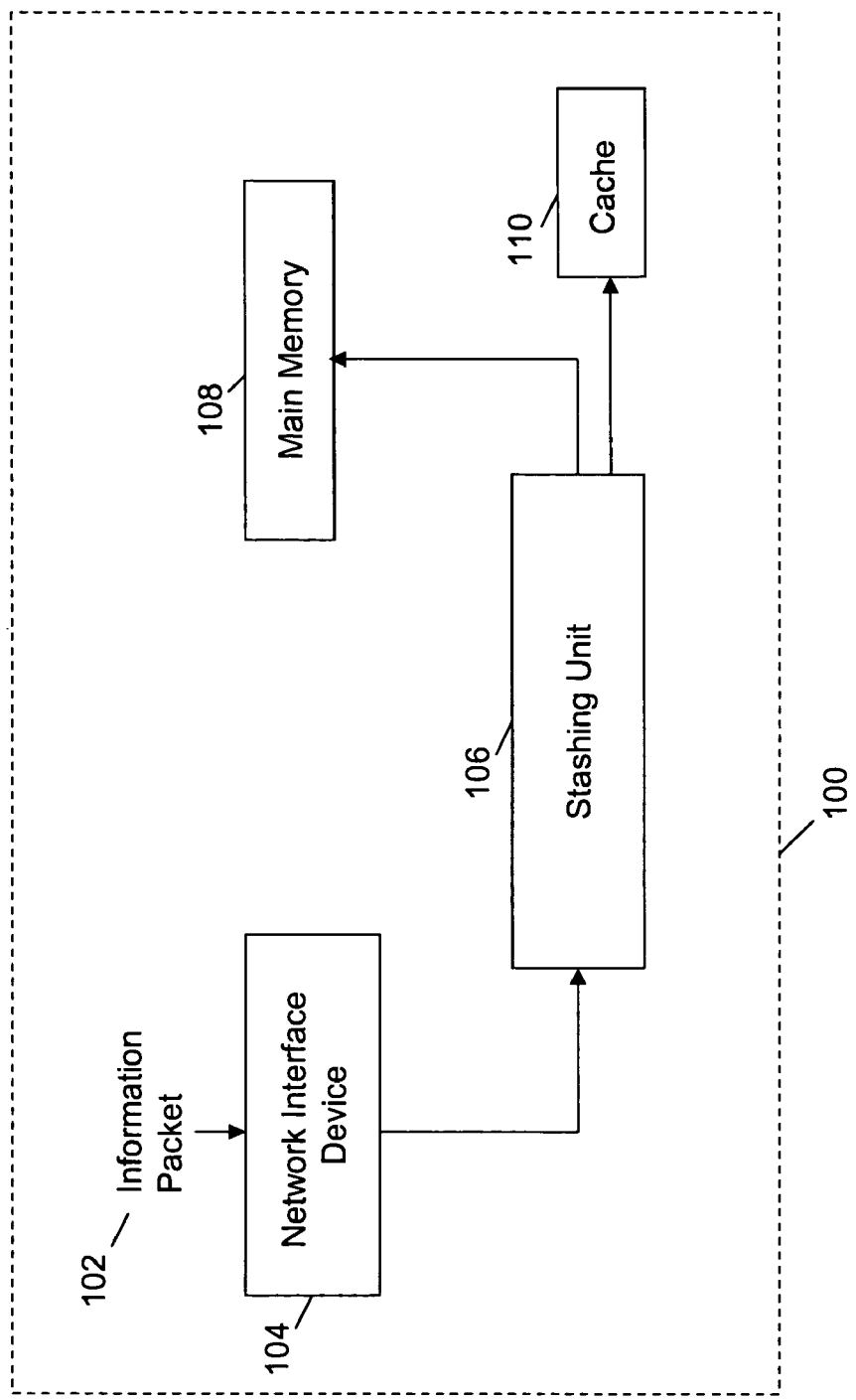
FIG. 1 illustrates the general environment wherein the various embodiments of the present invention can be practiced.

FIG. 1 illustrates a general environment, wherein the various embodiments of the present invention can be practiced. As depicted in FIG. 1, a system 100 includes a network interface device 104 that receives an information packet 102. Exemplary network interface device includes an Ethernet controller, an ATM controller, etc. Information packet 102 can be a regular Internet Protocol (IP) packet, an encrypted IP packet, and so forth. The information packet is stored in a main memory 108 and also stashed in a cache 110 by a stashing unit 106. Stashing reduces the effort of the CPU to go to main memory 108, to fetch the required information, as it is already present in cache 110.

Various embodiments of the present invention provide a method and system for adjusting the size of stashing. Specifically, for regular IP packets, the CPU usually only needs to look at the IP header of the information packet to make the routing decision. In an embodiment of the invention, the Transport Control Protocol (TCP) port numbers and the User Datagram Protocol (UDP) port numbers are also monitored for an extended access list. This is achieved by monitoring the packets beyond the layer-2 header and trailer. In various embodiments of the invention, network interface device 104 inspects the layer-3 header, and even layer-4 header, associated with the information packet to determine the stashing size. Inspection of the layer-3 and layer-4 headers can enable the network interface device to decide if decryption is needed and if the CPU can benefit by having the whole packet stashed in the cache. If so, stashing can be done for the whole packet. Network interface device 104 can also enable a programmer to overwrite its stashing size-determining algorithm by allowing the stashing sizes of different packets to be specified.

According to one embodiment of the present invention, a method for stashing an information packet by a network interface device is provided. The method includes i) extracting information from the received information packet; ii) determining the stashing size of the information packet; and iii) stashing the information packet, based on the determined size.

According to one embodiment of the invention, a system for stashing an information packet received by a network interface device is provided. The system includes i) an extracting unit for extracting information from the received packet; ii) a decision unit for determining the stashing size of the information packet; and (iii) a stashing unit for stashing the information packet in the determined size.

According to another embodiment of the invention, a machine-readable medium that includes instructions for stashing an information packet by a network interface device is provided. The medium includes i) one or more instructions for extracting information from the received packet; ii) one or more instructions for determining the stashing size of the information packet; and iii) one or more instructions for stashing the information packet, based on the determined size.

Figure 2:
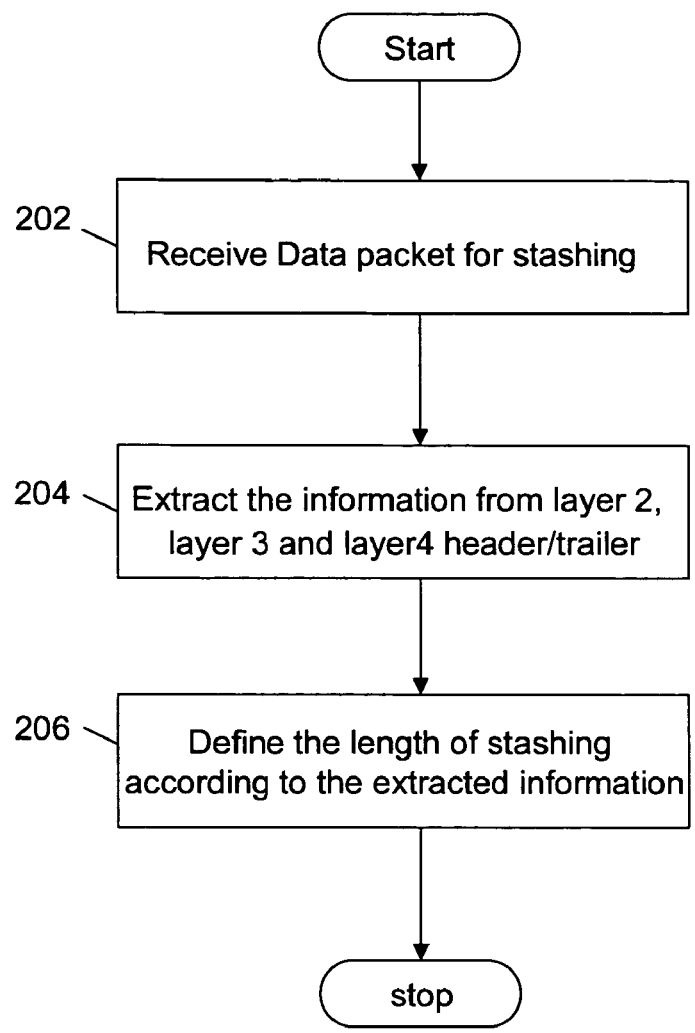
FIG. 2 is a flow chart depicting the method steps involved in dynamic stashing, in an embodiment of the invention.

FIG. 2 is a flow chart depicting the method steps involved in dynamic stashing, in an embodiment of the invention. The method starts at step 202, where an information packet is received by network interface device 104. The header/trailer information is extracted from the received information packet at step 204. In one embodiment of the invention, information about the information packet received can be extracted from the layer-2 header/trailer of the information packet. In an embodiment, Cyclic Redundancy Check (CRC) or checksum is used as the layer 2 trailer. Examples are ATM AAL5 trailer and Ethernet checksum. If the packet has CRC/checksum error, there is no need to stash the packet. In another embodiment of the invention, information about the information packet received can be extracted from the layer-3 header. The information derived from the layer-3 header and the layer-4 header includes the Internet Protocol (IP) address, the protocol number, and the Transmission Control Protocol (TCP) and/or User Datagram Protocol (UDP) port number, etc. In yet another embodiment of the invention, information about the received packet can be extracted from the layer-4 header. Based on the information extracted from the different layers, the length of stashing is decided at step 206.

In an embodiment of the invention, the stashing decision includes stashing only a part of the information packet. In another embodiment of the invention, the stashing decision includes disallowing stashing, based on the extracted information. In another embodiment of the invention, the stashing decision includes stashing the whole packet, based on the extracted information. Stashing the whole packet can be done for the encrypted information packets.

Figure 3:
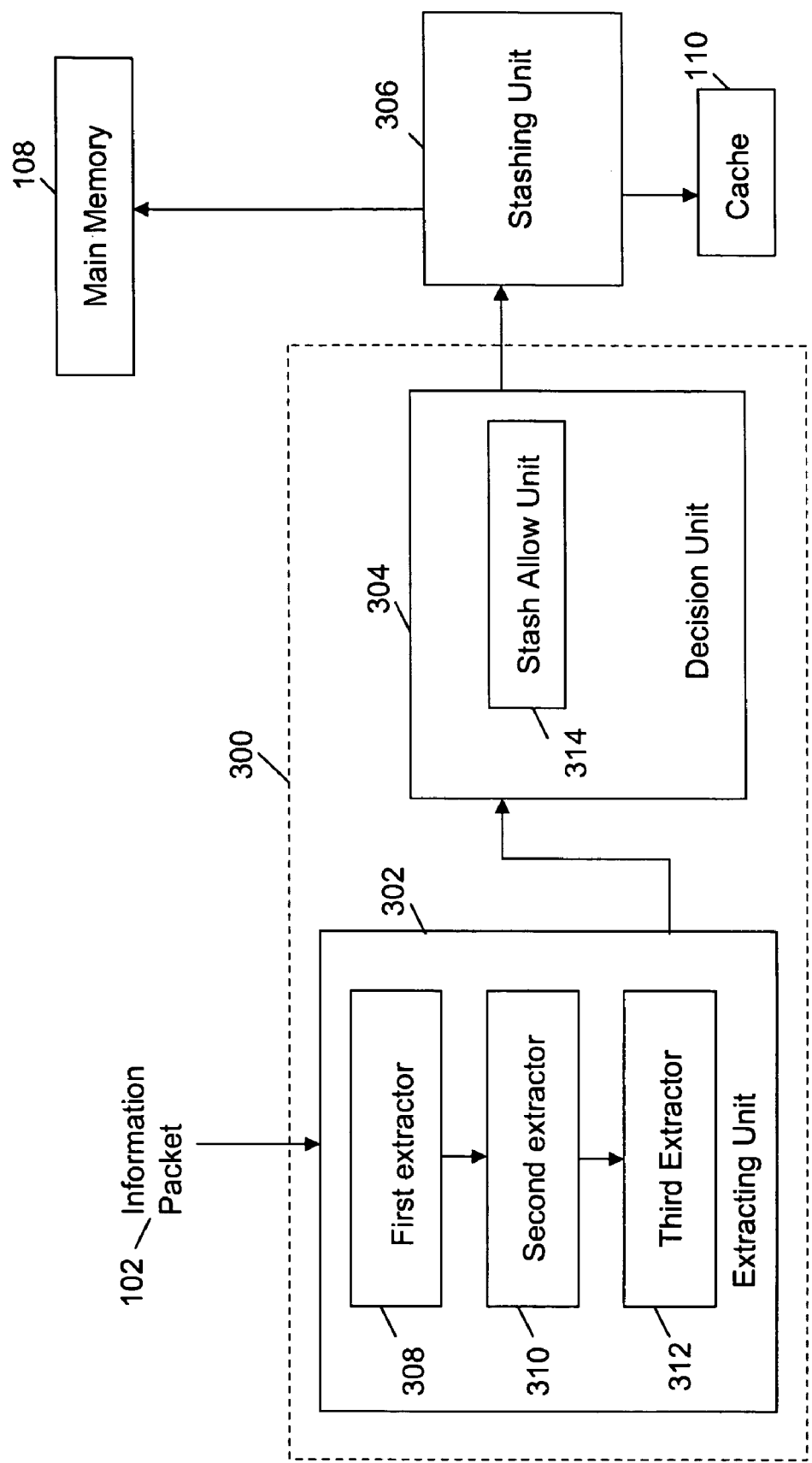
FIG. 3 is a block diagram illustrating a system for dynamic stashing, in an embodiment of the invention.

FIG. 3 is a block diagram that illustrates the various system elements involved in the process of stashing, according to an exemplary embodiment of the invention. A network interface device 300 may include an extracting unit 302, and a stashing unit 306. According to an embodiment of the invention, the network interface device may further include a decision unit 304. In an embodiment of the invention, extracting unit 302 further includes a first extractor 308 for extracting information from the layer-2 header/trailer of the received information packet, a second extractor 310 for extracting information from the layer-3 header of the received information packet, and a third extractor 312 for extracting information from the layer-4 header of the received information packet. Based on the information extracted from the various layer headers/trailers of the received information packets, a stashing decision is taken by decision unit 304. In an embodiment of the invention, decision unit 304 includes a stash allow unit 314 that can decide whether to enable stashing, based on the extracted information. In one embodiment on the invention, stashing is allowed for the complete information packet, if it has encrypted information. Based on the extracted information, stashing unit 306 stashes the information in main memory 108 and cache 110. In one embodiment of the invention, cache 110 is a layer-2 cache.

In various embodiments of the invention, system elements of network interface device 300 can be implemented in the form of software, hardware, firmware, or their combination thereof.

The pseudo code given below provides an exemplary method for incorporating various embodiments of the invention.

```
/*
 * The example below is for an Ethernet controller.
 *
 * input: inspect_layer4_header (TRUE or FALSE)
 *         - This requires software configuration.
 * crypto_handled_by_CPU (TRUE or FALSE)
 *         - This can be hardwired or configured by software. If crypto
 *         is handled by special hardware outside CPU and the special
 *         hardware does not need to access the cache, this should be
 *         set to FALSE. Otherwise, it should be set to TRUE.
 * router_ip_address [ ] (an array of IP addresses)
 *         - This requires software configuration
 */
/*
 * Check the Ethernet trailer first.
 */
If (There is checksum error) {
    stashing_length = 0; /* Do not bother to stash */
    return;
}
stashing_length = 14; /* for Ethernet header */
if (EtherType == 0x0800) {
    /* IP */
    stashing_length = stashing_length + IP header length (the IHL field * 4);
    /* Check IP header */
    if (IP destination address is one of the router's own addresses) {
        /* Check the protocol field in IP header */
        switch (protocol) {
        case TCP:
            stashing_length = stashing_length + TCP header length (20);
            break;
        case UDP:
            stashing_length = stashing_length + UDP header length (8);
```

-continued

```
            break;
        case IP in IP:
            /* Used for tunneling */
            stashing_length = stashing_length + second IP header length;
            break;
        case Encap Security Payload (ESP):
        case Authentication Header (AH):
            /* IP SEC */
            if (crypto_handled_by_CPU) {
                stashing_length = whole frame length;
            } else {
                stashing_length = stashing_length + IP SEC header length;
            }
            break;
        (Other cases for protocols are provided below.)
        }
    } else if (inspect_layer4_header) {
        /*
         * If Destination is not me, increase the stashing length
         * since we need to inspect layer 4 header.
         */
        /* Check the protocol field in IP header */
        switch (protocol) {
        case TCP:
            case UDP:
                /* Both TCP and UDP have the port numbers as the first 4 bytes. */
                stashing_length = stashing_length + 4;
                break;
        }
    }
} else if (EtherType == 0x86DD) {
    /* IPv6 */
    stashing_length = stashing_length + IPv6 header length;
    /* The rest is similar to IPv4 */
} else if (EtherType == AppleTalk or IPX) {
    /* check the headers and set the stashing_length accordingly */
}
```

As shown in the above pseudo code, the stashing length determined can be based on the layer-2, layer-3 and layer-4 headers/trailers. For example, the stashing length determined may vary with the communication protocol used, such as the TCP, UDP and IP protocols. It is to be noted that the various embodiments of the invention have been described, based on the layer-2, 3 and 4 headers/trailers, only for the purpose of illustration. Stashing length determination can also be based on other headers/trailers.

The embodiments of the invention have the advantage that the headers and trailers of the received information packet can be inspected on the fly, to make a decision regarding the stashing size. This dynamic stashing can lead to an improvement in the performance of the CPU communicating with the network interface device.

Although the invention has been discussed with respect to specific embodiments thereof, these embodiments are merely illustrative, and not restrictive, of the invention.

A network control system or management service can be any type of control used at a time of operation to reconfigure or modify a network or to otherwise allocate network resources. A network resource can implicate any type of network performance characteristic such as bandwidth (e.g., physical or virtual links or channels; time division, code division, frequency division or other multiplexing or sharing of lines, etc.), signal conversion and/or interfacing, processing resources (e.g., CPU cycles, memory capacity, storage, input/output ports or other resources, etc.), network storage, buffering or other network resources.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Although specific protocols have been used to describe embodiments, other embodiments can use other transmission protocols or standards. Use of the terms "peer," "client" and "server" can include any type of device, operation or other process. The present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method of adjusting a packet stashing size, the method comprising:
    receiving a packet in a network interface device, the network interface device being coupled to a main memory and a cache memory;
    extracting information from the received packet;
    using the extracted information to check for errors in the received packet, and to determine whether a cryptographic operation is to be subsequently used to decrypt the received packet;
    storing a full amount of the received packet in the main memory;
    stashing the full amount of the received packet in the cache memory in response to the determination that the cryptographic operation is to be subsequently used to decrypt the received packet;
    stashing only a header from the received packet in the cache memory in response to the determination that the cryptographic operation is not to be subsequently used on the received packet; and
    disallowing stashing to the cache memory in response to the check for errors indicating errors in the received packet.

2. The method of claim 1, wherein the extracting information comprises extracting from a layer-2 header of the received packet.

3. The method of claim 1, wherein the extracting information comprises extracting from a layer-3 header of the received packet.

4. The method of claim 1, wherein the extracting information comprises extracting from a layer-4 header of the received packet.

5. The method of claim 1, wherein the received packet comprises an Internet protocol (IP) packet.

6. The method of claim 1, further comprising specifying a size of the stashing to the cache memory.

7. An apparatus for adjusting a packet stashing size, the apparatus comprising:
    a computer processor; and
    a non-transitory computer-readable storage medium including one or more instructions executable by the computer processor for:
    receiving a packet in a network interface device, the network interface device being coupled to a main memory and a cache memory;
    extracting information from the received packet;
    using the extracted information to check for errors in the received packet, and to determine whether a cryptographic operation is to be subsequently used to decrypt the received packet;
    storing a full amount of the received packet in the main memory;
    stashing the full amount of the received packet in the cache memory in response to the determination that the cryptographic operation is to be subsequently used to decrypt the received packet;
    stashing only a header from the received packet in the cache memory in response to the determination that the cryptographic operation is not to be subsequently used on the received packet, and
    disallowing stashing to the cache memory in response to the check for errors indicating errors in the received packet.

8. A non-transitory computer-readable storage medium including instructions executable by a computer processor for adjusting a packet stashing size, the computer-readable storage medium comprising one or more instructions for:
    receiving a packet in a network interface device, the network interface device being coupled to a main memory and a cache memory;
    extracting information from the received packet; using the extracted information to check for errors in the received packet, and
    to determine whether a cryptographic operation is to be subsequently used to decrypt the received packet;
    storing a full amount of the received packet in the main memory; stashing the full amount of the received packet in the cache memory in response to the determination that the cryptographic operation is to be subsequently used to decrypt the received packet;
    stashing only a header from the received packet in the cache memory in response to the determination that the cryptographic operation is not to be subsequently used on the received packet, and
    disallowing stashing to the cache memory in response to the check for errors indicating errors in the received packet.

9. The method of claim 1, wherein the extracting information comprises extracting from a layer-2 trailer of the received packet.

10. The method of claim 9, wherein the layer-2 trailer comprises a cyclic redundancy check (CRC), the CRC being used in the check for errors.

11. The method of claim 9, wherein the layer-2 trailer comprises a checksum, the checksum being used in the check for errors.

12. The method of claim 1, wherein the extracting information comprises at least one of:
    extracting from a layer-2 header of the received packet;
    extracting from a layer-3 header of the received packet; and
    extracting from a layer-4 header of the received packet.

13. The method of claim 12, further comprising extracting from a layer-2 trailer of the received packet.

14. The method of claim 1, wherein the network interface device comprises an Ethernet controller.

15. The method of claim 1, wherein the network interface device comprises an asynchronous transfer mode (ATM) controller.

16. The method of claim 1, wherein the extracted information comprises an IP address.

17. The method of claim 1, wherein the extracted information comprises a protocol number.

18. The method of claim 1, wherein the extracted information comprises a transmission control protocol (TCP) port number.

19. The method of claim 1, wherein the extracted information comprises a user datagram protocol (UDP) port number.

20. The method of claim 1, wherein the cache memory comprises a single Layer 2 cache.

* * * * *